Patented July 24, 1923.

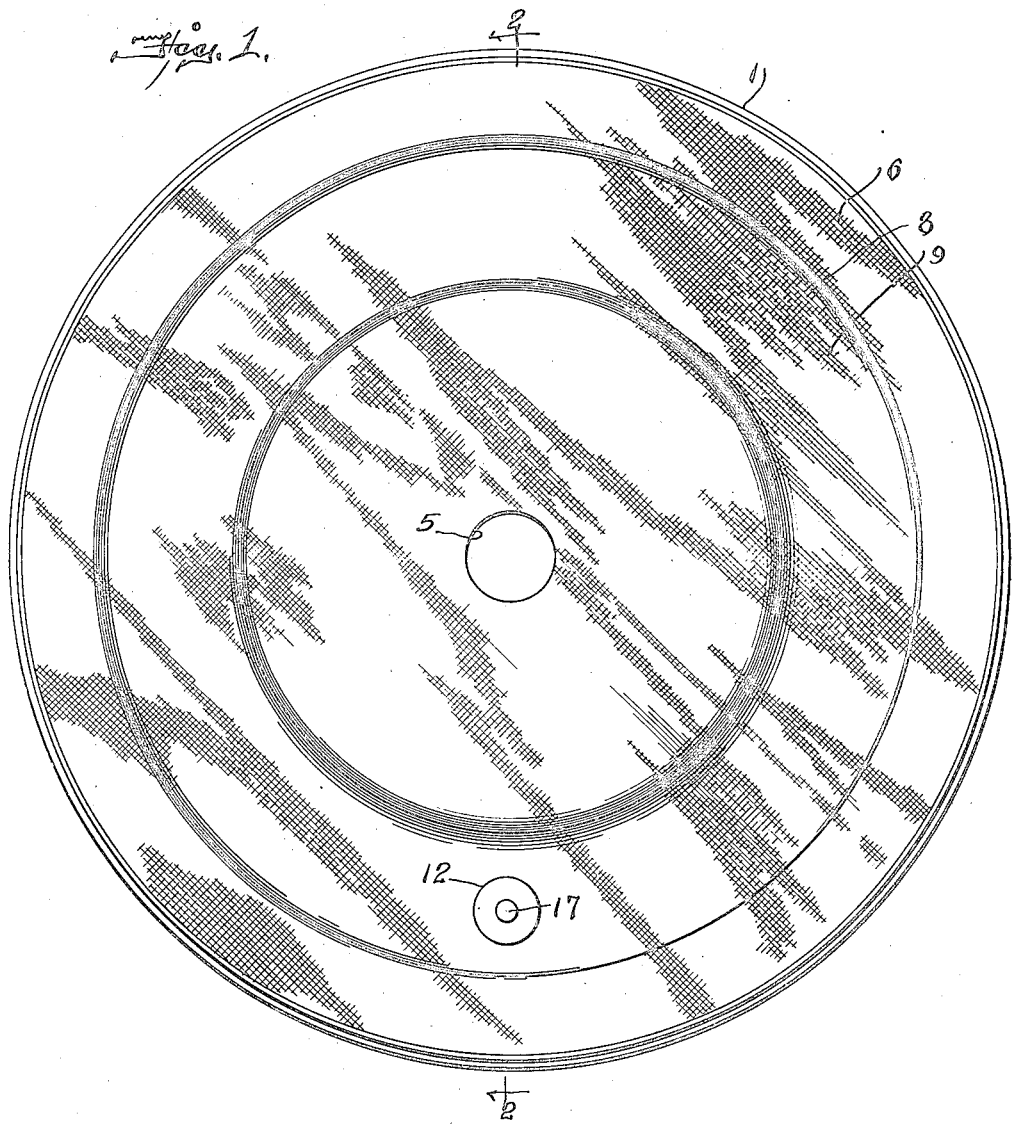

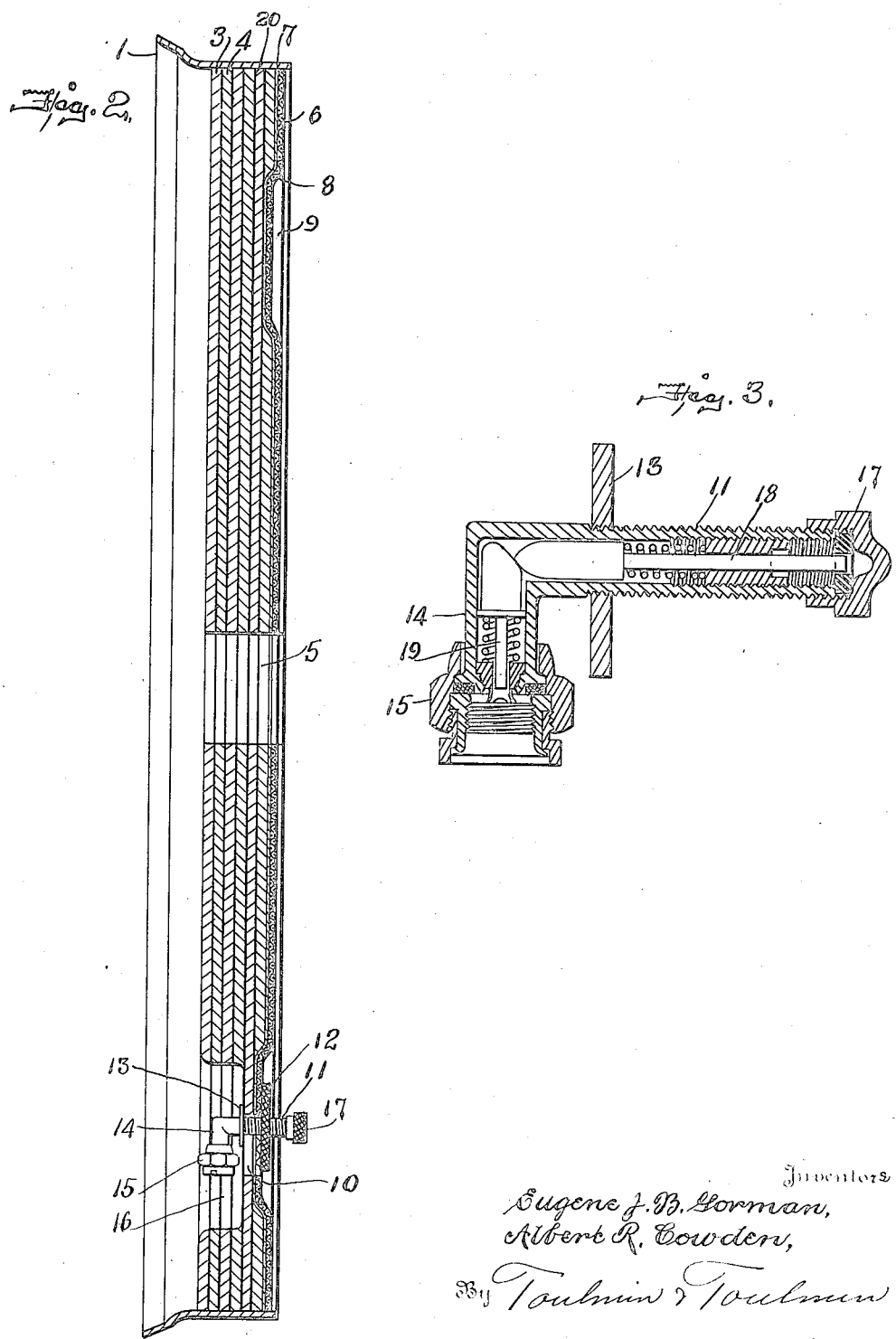

1,462,687

UNITED STATES PATENT OFFICE.

ALBERT RALPH COWDEN AND EUGENE J. B. GORMAN, OF DAYTON, OHIO.

LAMINATED STRUCTURE FOR WHEELS.

Application filed April 7, 1922. Serial No. 550,321.

*To all whom it may concern:*

Be it known that we, ALBERT RALPH COWDEN and EUGENE J. B. GORMAN, citizens of the United States, residing at Dayton, in the county of Montgomery and State of Ohio, have invented certain new and useful Improvements in Laminated Structures for Wheels, of which the following is a specification, reference being had therein to the accompanying drawing.

Our invention relates to a new article of manufacture in connection with laminated structures and the process of making them and in particular in connection with structures for wheels and the like.

It is an object of our invention to provide a laminated structure that will be impervious to moisture, which will not crack, warp or bend, which will retain paint and other coatings without blistering or cracking and which will withstand the effects of varying degrees of temperature and atmospheric conditions as well as the abrasive effect of mud, dirt and similar foreign materials.

It is a further object of our invention to provide a laminated structure in which portions of the laminated structure may be cut away to give varying configurations to the surface of the structure without the disadvantage of the grains of the laminations showing, warping, cracking or splitting and with the advantage that painting or other decorating coats may be applied and retained without the disclosure of different grains beneath and without the disadvantage of different rates of absorption due to different grains constituting the surface of the laminated structure.

It is a further object to provide a laminated wood wheel of straight parallel laminations which will give the impression to the eye of a disk wheel.

It is an additional object to provide a structure consisting of a combination of a coagulant upon a porous surface such as wood, an adhesive, a textile, or similar fibrous material and in some instances with a waterproofing compound in order to provide a surface impervious to moisture, dust and other abrasive or deteriorating substances.

It is a further object to provide an automotive wheel of laminated wood construction which will have the same appearance as a disk wheel of the type pressed out of metal.

Referring to the drawings:

Fig. 1 is a front elevation of an automobile wheel of the disk type with a portion of the flat surface cut-away in a groove and with the textile covering applied to the surface;

Fig. 2 is a vertical section through the wheel on the line 2—2 of Fig. 1;

Fig. 3 is a section through the valve construction.

Referring to the drawings, 1 is the usual metal rim upon which the tire rim is mounted; 2 is the wheel consisting of a plurality of wooden laminations 3 and 4, the grain of which run in alternate directions. This wheel is pierced at 5 for the hub and axle. The surface of the wheel is covered with a textile medium 6 with which is incorporated a glue which is also coated upon the face of the wheel and is shown at 7. The face of the wheel is cut away as at 8 in a groove 9 exposing the edge of the grain at 8.

Located in this groove is a slot 10 in which travels a valve stem 11 and in which is located the retaining plate 12 mounted thereon. This plate 12 embraces the wheel between it and the retaining shoulder 13 carried by this stem 11. The right angled portion 14 of this valve is connected through the hexagonal nut 15 with the usual head of the valve stem of a pneumatic tire that passes up through a passage way out into the wheel. This passage way is shown in its expanded area at 16 to give room for the fingers of the operator to manipulate the nut 15 in making the connection. A knurled head 17 is mounted on 11 which, when removed, permits of the attachment of the air hose or the air gauge. The layers or laminations 3 and 4 are preferably joined by an adhesive 20.

It will be understood that from the exterior of this wheel it is possible through the structure shown in Figure 3, explained in the copending application of Eugene J. B. Gorman, No. 412,844, to manipulate the valve attached to the pneumatic tire and therefore control the entrance and exit of air thereto and therefrom.

It is possible to utilize with success our invention without the textile medium but we prefer to use this medium as a covering in those cases where it is necessary to furnish a surface which will retain paint and varnish under certain given conditions and where the medium applied will be absorbed by the grain as at 8.

The numeral 18 refers to a valve actuating member and 19 refers to a second valve actuating member.

It will be understood that we may use either textiles, paper or other mediums as a covering for the face of the wheel and when we use the term textile it is used in that broad sense and meaning.

It will be understood in applying the textile or fibrous material 6 to the laminations of wood which are more or less porous that we use an adhesive and with the adhesive in some instances we employ a coagulant which waterproofs the surface of the wood preventing the entrance of moisture into the wood. Upon occasion we may also put this coagulant or waterproofing material on the surface of the textile or fibrous material but this is not essential.

While we have shown and described certain features as constituting our invention, it will be understood that parts have been shown for purposes of illustration only, and that we do not desire to be limited to such details, as obvious modifications will occur to persons skilled in the art.

Having thus fully described our invention, what we claim as new and desire to secure by Letters Patent, is:—

1. In combination, a laminated wood wheel having a lamination cut away on one face thereof to form a groove in said face, and a textile covering therefor attached thereto on the face thereof.

2. In combination, in a laminated wood wheel, of a plurality of laminations, a portion of said laminations cut away in the face thereof to form a groove, and a textile covering therefor attached thereto on the face thereof.

3. In combination, in a laminated wood wheel, of a plurality of laminations, a portion of said laminations cut away in the face thereof to form a groove with tapering walls, and a textile covering therefor attached thereto on the face thereof.

4. In combination, a plurality of laminations with the grains of the lamination being placed in directions at right angles to each other in alternate layers, a cutaway portion to form a groove in one face of the structure, an adhesive applied to said face and a textile fabric incorporated with and applied to said adhesive to form an integral structure therewith and with the laminated structure to follow the contours thereof, and a metal rim mounted thereon to support a tire rim.

5. In a process of forming a wheel, placing laminated wood elements one upon the other, cutting away a portion of the face of the wheel in a groove to give a dished appearance to the surface of the wheel, and applying a coating of adhesive to the face of the wheel and applying thereto a textile medium whereby the entire structure becomes a unit upon drying.

6. In a process of forming a wheel, placing laminations one upon the other with adhesive therebetween, placing a waterproofing compound on the outer surface of one of the laminations, placing adhesive thereon, and placing a fibrous medium thereon.

7. In a process of forming a wheel, placing laminations one upon the other with adhesive therebetween, placing a waterproofing compound on the outer surface of one of the laminations, placing adhesive thereon, placing a fibrous medium thereon, and coating the fibrous medium with a waterproofing compound.

In testimony whereof, we affix our signatures.

ALBERT RALPH COWDEN.
EUGENE J. B. GORMAN.